(12) United States Patent
Liu et al.

(10) Patent No.: US 10,558,039 B2
(45) Date of Patent: Feb. 11, 2020

(54) HEAD-UP DISPLAY APPARATUS

(71) Applicant: DENSO CORPORATION, Kariya, Aichi-pref. (JP)

(72) Inventors: Heng Liu, Kariya (JP); Masayuki Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 6 days.

(21) Appl. No.: 15/561,383

(22) PCT Filed: Mar. 21, 2016

(86) PCT No.: PCT/JP2016/001620
§ 371 (c)(1),
(2) Date: Sep. 25, 2017

(87) PCT Pub. No.: WO2016/157815
PCT Pub. Date: Oct. 6, 2016

(65) Prior Publication Data
US 2018/0081172 A1    Mar. 22, 2018

(30) Foreign Application Priority Data

Apr. 3, 2015 (JP) ................................ 2015-077081

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *G02B 5/0816* (2013.01);
(Continued)

(58) Field of Classification Search
CPC ...... G02B 27/0101; G02B 27/01–0189; G02B 5/08–0891; G03B 21/00–64; H04N 9/31–3197
See application file for complete search history.

(56) References Cited

U.S. PATENT DOCUMENTS

2009/0135316 A1* 5/2009 Horikoshi ............ G02B 5/3083
349/5
2010/0110543 A1* 5/2010 Kaizawa .............. G02B 5/3083
359/489.07
(Continued)

FOREIGN PATENT DOCUMENTS

JP        2002196414 A    7/2002
JP          4114194 B2    7/2008
(Continued)

*Primary Examiner* — Cara E Rakowski
*Assistant Examiner* — Christopher A Lamb, II
(74) *Attorney, Agent, or Firm* — Harness, Dickey & Pierce, P.L.C.

(57) ABSTRACT

A head-up display apparatus mounted on a moving body. The head-up display apparatus projects an image on a projecting portion. The head-up display apparatus includes a light source portion, an imaging element, a cold mirror, and a phase shifter. The light source portion emits a source light. The imaging element generates the image and outputs the light of the image. The light of the image has a predetermined polarization state. The cold mirror reflects the light of the image toward the projecting portion. In the cold mirror, an optical multilayer film is disposed on a translucent base member, and the light of the image obliquely enters the cold mirror along a plane of incidence of the cold mirror. The phase shifter converts the light of the image into an S wave. The phase shifter is disposed on an optical path between the imaging element and the cold mirror.

9 Claims, 4 Drawing Sheets

(51) Int. Cl.
*G02B 27/28* (2006.01)
*G02B 5/08* (2006.01)

(52) U.S. Cl.
CPC ...... *G02B 27/286* (2013.01); *B60K 2370/331* (2019.05); *B60K 2370/334* (2019.05); *B60K 2370/349* (2019.05); *G02B 2027/0116* (2013.01); *G02B 2027/0145* (2013.01)

(56) References Cited

U.S. PATENT DOCUMENTS

| | | | |
|---|---|---|---|
| 2014/0184996 A1* | 7/2014 | Matsushita | G02B 27/0101 349/117 |
| 2014/0253821 A1* | 9/2014 | Takatoh | B60K 35/00 349/11 |
| 2015/0098029 A1 | 4/2015 | Sato et al. | |
| 2016/0109752 A1* | 4/2016 | Tateno | G02F 1/134336 349/5 |

FOREIGN PATENT DOCUMENTS

| | | | |
|---|---|---|---|
| JP | 2009067352 A | 4/2009 | |
| JP | 2010113197 A | 5/2010 | |
| JP | 2013224068 A | 10/2013 | |
| JP | 2013228442 A | 11/2013 | |

* cited by examiner

HEAD-UP DISPLAY APPARATUS

CROSS REFERENCE TO RELATED APPLICATIONS

This application is a U.S. National Phase Application under 35 U.S.C. 371 of International Application No. PCT/JP2016/001620 filed on Mar. 21, 2016 and published in Japanese as WO 2016/157815 A1 on Oct. 6, 2016. This application is based on and claims the benefit of priority from Japanese Patent Application No. 2015-077081 filed on Apr. 3, 2015. The entire disclosures of all of the above applications are incorporated herein by reference.

TECHNICAL FIELD

The present disclosure relates to a head-up display apparatus (hereinafter, referred to as an HUD apparatus), which is mounted on a moving body. The HUD apparatus displays a virtual image that can be seen by an occupant in a vehicle.

BACKGROUND ART

Conventionally, an HUD apparatus is mounted on a moving body and projects a virtual image on a projecting portion. An occupant can see the virtual image that is displayed by the HUD apparatus. The HUD apparatus disclosed in Patent Literature 1 includes a light source portion, an imaging element, and a cold mirror. The light source portion emits a light as a light source. The imaging element generates an image using the light entered, and outputs the light of the image, which has a predetermined polarization state. In the cold mirror, an optical multilayer film is configured to be disposed on a translucent base member. The light of the image, which obliquely enters the cold mirror along an incidence plane (plane of incidence), is reflected on the cold mirror toward the projecting portion. The optical multilayer film of the cold mirror is formed by multilayer interference film, and manufactured by a vapor deposition method or the like.

PRIOR ART LITERATURE

Patent Literature

Patent Literature 1: JP 2009-67352 A

SUMMARY OF INVENTION

In the above-described configuration of a cold mirror, a light of an image obliquely enters the cold mirror along a plane of incidence. The light enters the cold mirror has an electric field vector, and the electric field vector includes both a parallel component (hereinafter, referred to as a P wave component) parallel to the plane of incidence and a perpendicular component (hereinafter, referred to as an S wave component) perpendicular to the plane of incidence. With this configuration, phase difference occurs between the P wave component and the S wave component, and a polarization state of the light after reflected on the cold mirror may change from a polarization state of the light before the reflection. Since this optical characteristic depends on a wavelength of the light, the polarization state may differ according to the wavelength.

When the light of the image whose polarization state differs according to the wavelength is reflected toward a projecting portion, according to Fresnel equations, a reflection rate differs due to the wavelength. Thus, a spectral distribution of the light of the image recognized by an occupant differs from a spectral distribution of the light of the image generated by an imaging element. For example, when the image of a white light is generated by the imaging element, the occupant may recognize the light as a color tinged with yellow. Thus, this configuration has difficulty in reproducing the exact color of the image generated by the imaging element.

In view of the foregoing difficulties, it is an object of the present disclosure to provide an HUD apparatus that provides high color reproducibility.

According to an aspect of the present disclosure, a head-up display apparatus mounted on a moving body is provided. The head-up display apparatus projects an image on a projecting portion as a virtual image, and the virtual image is recognized by an occupant when a light of the image is reflected on the projecting portion. The head-up display apparatus includes a light source portion, an imaging element, a cold mirror, and a phase shifter. The light source portion emits a source light. The imaging element generates the image when the source light enters the imaging element, and outputs the light of the image. The light of the image has a predetermined polarization state. The cold mirror reflects the light of the image toward the projecting portion. In the cold mirror, an optical multilayer film is disposed on a translucent base member, and the light of the image obliquely enters the cold mirror along a plane of incidence. The phase shifter converts the light of the image into an S wave. The phase shifter is disposed on an optical path between the imaging element and the cold mirror, and the light of the image outputted from the phase shifter enters the cold mirror.

In the above-described HUD apparatus, a viewer can recognize the image that shows a color approximately maintaining the original color generated by the imaging element. Thus, the HUD apparatus can provide high color reproducibility.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. In each embodiment, sections corresponding to items described in the preceding embodiment are denoted by the same reference symbols, and their repetitive description might be omitted. In each embodiment, in the case where only a part of a configuration is described, the precedingly described embodiment can be applied to the other part of the configuration. Except for the combination explicitly indicated by each embodiment, the configurations of the embodiments can be partially combined together unless there is a contradiction although no explicit embodiment is described.

First Embodiment

Figure 1:
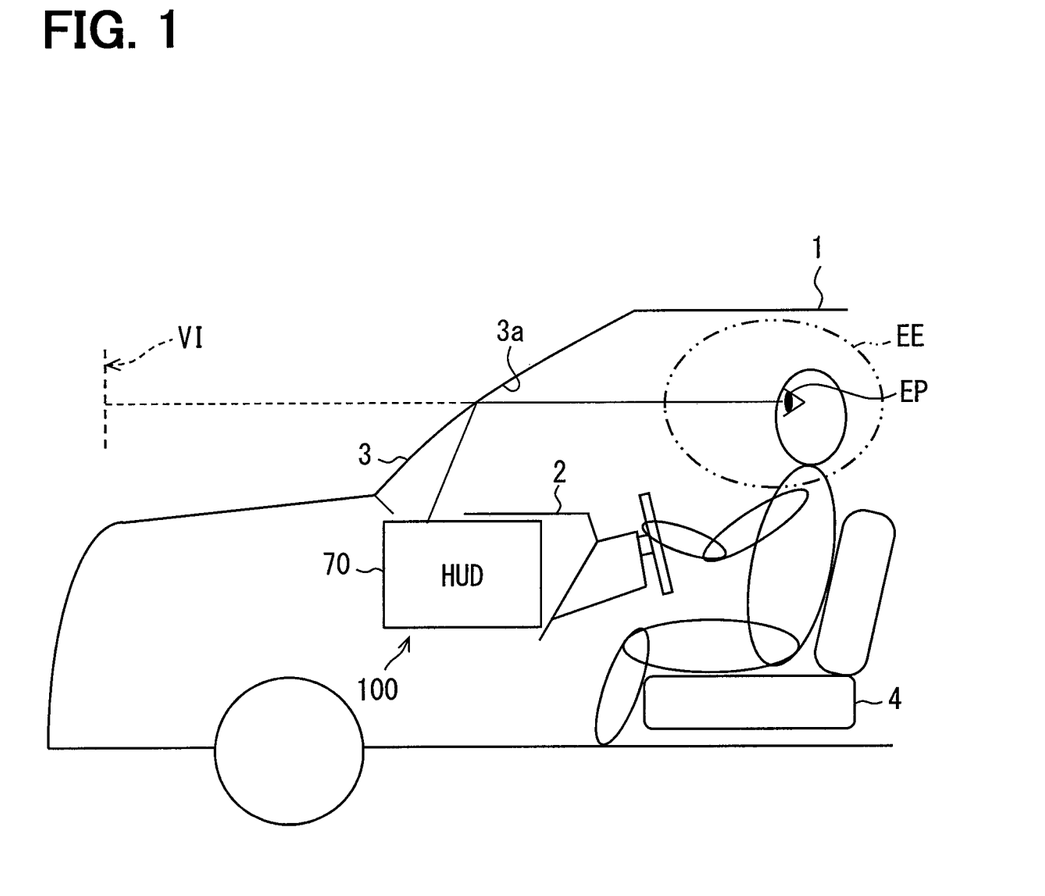
FIG. 1 is a diagram showing a schematic view of an HUD apparatus mounted on a vehicle according to a first embodiment of the present disclosure.

As shown in FIG. 1, an HUD apparatus 100 in a first embodiment of the present disclosure is mounted on a vehicle 1, which is a kind of a moving body, and is housed in an instrument panel 2. The HUD apparatus 100 projects an image on a windshield 3 of the vehicle 1. The windshield 3 functions as a projecting portion. A light of the image from the HUD apparatus 100 is reflected toward the windshield 3. With this configuration, the HUD apparatus 100 displays a virtual image that can be seen by an occupant in the vehicle 1. The light of the image is reflected toward the windshield 3, and arrives at an eye point EP of the occupant in a compartment of the vehicle 1. The occupant perceives the light of the image as a virtual image VI. The occupant can recognize various kinds of information by the virtual image VI. The information that is displayed as a virtual image VI includes a vehicle state value, navigation information, or the like. For example, the vehicle state value includes a vehicle speed or a fuel remaining amount, and the navigation information includes road information or visibility supporting information.

The windshield 3 of the vehicle 1 has a plate shape, and is made of glass or synthetic resin. On a vehicle's compartment side of the windshield 3, a projecting surface 3a is disposed to project the image, and the projecting surface 3a has a concave shape or has a flat plane shape.

Usually, a shape of the windshield 3, and a relative position of the instrument panel 2 and the seat 4 to the windshield 3 are designed by a vehicle manufacturer based on a purpose of use, a design plan or the like of the vehicle 1. The HUD apparatus 100 is optically designed so that the light reflected on the windshield 3 arrives in an eyelips EE. The eyelips EE is a space region that the eye point EP of the occupant sitting on the seat 4 may exist. Thus, in order to construct the configuration of the HUD apparatus 100 in the limited space of the instrument panel 2, a mounting condition is restricted. Specifically, an arrangement of an optical element of the HUD apparatus 100, an incident angle of the light of the image toward the windshield 3 or the like is restricted. Usually, the incident angle is set to be equal to or greater than 20 degrees and less than 90 degrees. In the present embodiment, the incident angle is set to 65 degrees as an example.

Figure 2:
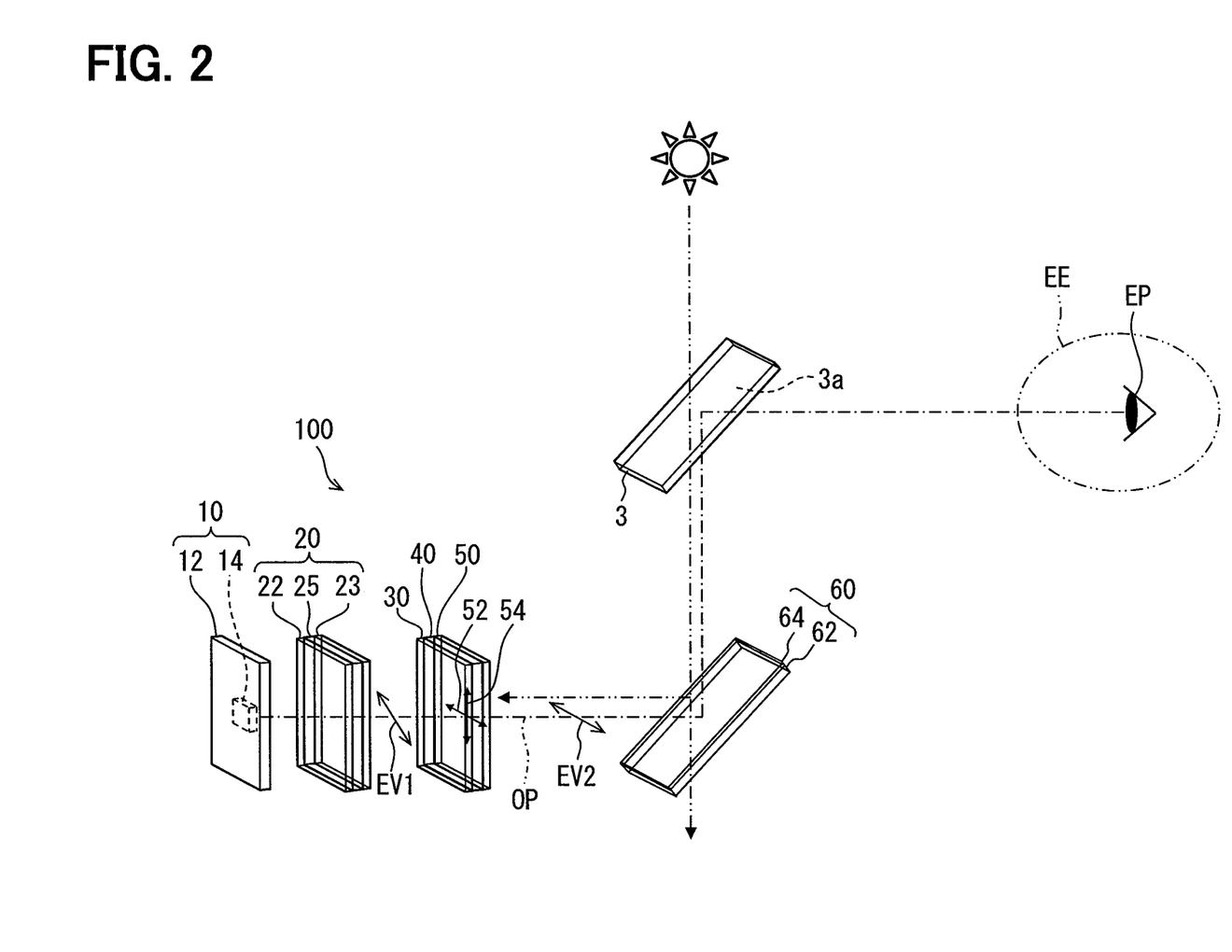
FIG. 2 is a diagram schematically showing a configuration of the HUD apparatus according to the first embodiment.

The following will describe a concrete configuration of the HUD apparatus 100 with reference to FIG. 2. The HUD apparatus 100 includes a light source portion 10, a liquid crystal panel 20 as an imaging element, a phase difference film 30 as a phase shifter, a polarizing film 50 as a polarizing element, a translucent substrate 40 supporting the phase difference film 30 and the polarizing film 50, and a cold mirror 60. With these elements, an optical path OP from the light source portion 10 to the eyelips EE in the vehicle 1 is defined. Each of the elements 10, 20, 40, 60, which defines the optical path OP, is supported in a housing 70 (see FIG. 1). FIG. 2 shows a schematic configuration. A size of each of the elements 10, 20, 30, 40, 50, 60, a distance between adjacent two of the elements 10, 20, 30, 40, 50, 60, and angles of the incident light and reflected light are not limited by FIG. 2.

The light source portion 10 has a light source circuit board 12 and a light emitting diode element 14. On the light source circuit board 12, the light emitting diode element 14 is electrically connected with a power source via a wiring pattern of the circuit. The light emitting diode element 14 emits a light as a light source, and an emission amount of the light corresponds to a current amount supplied from the power source during turn-on state of the power source. In the light emitting diode element 14, an emission of pseudo-white light, which has random polarization state and has visible lights with various wavelengths, is achieved, for example, by covering a blue light-emitting diode with a phosphor. The light emitted from the light source portion 10 enters the liquid crystal panel 20.

In the liquid crystal panel 20, the image is generated when the light enters the liquid crystal panel 20. Then, the liquid crystal panel 20 outputs the light, which generates the image and has a predetermined polarization state. The liquid crystal panel 20 in the present embodiment is provided by a transmissive liquid crystal panel, and provided by a dot matrix type TFT (Thin Film Transistor) liquid crystal panel configured by multiple liquid crystal pixels that are arranged in two-dimensional direction. In the liquid crystal panel 20, a pair of image generation polarizing filters 22, 23 and a liquid crystal panel 25 are stacked. The liquid crystal panel 25 is sandwiched by the pair of image generation polarizing filters 22, 23. In the image generation polarizing filters 22, 23, an electric field vector has a property of transmitting the light that advances along a predetermined direction and has the property of shielding the light whose direction is substantially perpendicular to the predetermined direction. Each of the image generation polarizing filters 22, 23 is disposed to be substantially perpendicular to the predetermined direction. The liquid crystal layer 25 is capable of rotating a polarization direction of the light entered into the liquid crystal layer 25. The rotation amount is defined corresponding to a voltage that is applied to each of the liquid crystal pixels.

When the light from the light source enters the liquid crystal panel 20, the liquid crystal panel 20 controls a transmittance rate of the light that enters each of the liquid crystal pixels, and is capable of generating the image. The liquid crystal panel 20 outputs the light of the image. Herein, the light that generates the image has the predetermined polarization state. In the image generation polarizing filter 23 of the present embodiment, the predetermined direction is defined as a direction that is angled at 45 degrees diagonally from the horizontal direction of the image. So, the predetermined polarization state by a transmission through the polarizing filter 23 is set to be linear polarization, in which the direction of an electric field vector EV1 is angled at 45 degrees diagonally from the horizontal direction of the image. When the predetermined direction of the image generation polarizing filter 23 is set according to the above-described method, a commercially available liquid crystal panel can be used as the liquid crystal panel 20. Thus, a manufacturing cost can be restricted.

The adjacent liquid crystal pixels are provided with color filters having different colors from each other (for example, red, green, and blue), and a combination of the colors is capable of achieving various colors. The light of the image output from the liquid crystal panel 20 has various wavelengths that include spectral distribution corresponding to each of transmission properties of the color filters. The light is transmitted toward the cold mirror 60 through the phase difference film 30, the translucent substrate 40, and the polarizing film 50. Each of the color filters of the present embodiment is capable of transmitting a visible light having a specific wavelength range that includes various wavelengths.

In the cold mirror 60, an optical multilayer film 64 is disposed on a translucent base member 62. The translucent base member 62 of the present embodiment has a plate shape, and is made of glass or synthetic resin. The optical multilayer film 64 is an interference film disposed on one surface of the cold mirror 60, and is manufactured by a vapor deposition method or the like. The one surface of the cold mirror 60, on which the optical multilayer film 64 is disposed, faces the translucent substrate 40 supporting the phase difference film 30 and the polarizing film 50, and also faces the windshield 3. The optical multilayer film 64 is configured by stacking optical thin films on the one surface of the cold mirror 60 in a normal direction of the surface. The optical multilayer film 64 has at least two optical thin films made of respective optical material having different complex index of refractions from each other. Each complex index of refraction of the optical material employed by the optical thin film includes a real part having wavelength dependence and an imaginary part.

A dielectric film or a metal film may be employed as the optical thin film. The optical multilayer film 64 in the present embodiment is provided by a ten-layered multilayer film, which includes a dielectric film made of silicon dioxide ($SiO_2$), titanium dioxide ($TiO_2$), or the like.

A thickness of each optical thin film is properly set by a calculation using a computer or the like so that each of the optical thin films has a spectral characteristic that enables a reflectance of the visible light to be higher than a reflectance of an infrared light or an ultraviolet light (that is, the spectral characteristic which enables a transmission of at least a part of the infrared light or the ultraviolet light). For the light of the image obliquely entering along a plane of incidence (in the present embodiment, for example, the incident angle is set to 45 degrees), the cold mirror 60 in the present embodiment has energy reflectance of equal to or greater than 95 percent within the wavelength range of 400 nm to 700 nm. The plane of incidence is a plane that includes a ray of the light of the image entering the cold mirror 60 and the normal line of the surface of the cold mirror 60.

On the optical path OP between the liquid crystal panel 20 and the cold mirror 60, the phase difference film 30 having a film shape is disposed. The phase difference film 30 converts the polarization state of the light of the image by generating phase difference in the light of the image outputted from the liquid crystal panel 20. The phase difference film 30 converts the light of the image, which is going to enter the cold mirror 60, into an S wave. In the present embodiment, the linear polarization in which a direction of the electric field vector EV1 is angled at 45 degrees diagonally from the horizontal direction of the image is converted into the linear polarization in which a direction of an electric field vector EV2 is along the horizontal direction.

A conversion of the light of the image, which enters the cold mirror 60, into the S wave means a conversion into a state in which a magnetic field vector of the light of the image entering the cold mirror 60 is along the plane of incidence.

On the optical path OP between the phase difference film 30 and the cold mirror 60, the polarizing film 50 having the film shape is disposed. The polarizing film 50 defines a transmission axis 52 and a light shield axis 54, which are substantially perpendicular to each other. The polarizing film 50 has a property of transmitting the light of the electric field vector along the transmission axis 52 and shielding the light of the electric field vector along the light shield axis 54. The light shield axis 54 is disposed along the plane of incidence of the cold mirror 60. The transmission axis 52 is disposed along the polarization direction of the light of the image converted by the phase difference film 30 (in the present embodiment, along the horizontal direction). The polarizing film 50 in the present embodiment absorbs the light of the electric field vector along the direction of the light shield axis 54. Alternatively, the polarizing film 50 may reflect the light of the electric field vector along the direction of the light shield axis 54.

The translucent substrate 40 has a plate shape, and is made of glass or synthetic resin. In the translucent substrate 40, the phase difference film 30 is attached to one surface facing the liquid crystal panel 20, and the polarizing film 50 is attached to another surface facing the cold mirror 60. With this configuration, the phase difference film 30 and the polarizing film 50 are supported by the same translucent substrate 40.

With the above-described configuration, in the light of the image outputted from the liquid crystal panel 20, the direction of the polarization is rotated by the phase difference film 30. Then, the light transmits through the polarizing film 50 and diagonally enters the cold mirror 60 as the S wave. The light of the image is reflected by the cold mirror 60 based on the spectral characteristic of the optical multilayer film 64 of the cold mirror 60, and then, transmits toward the windshield 3. The windshield 3 reflects the light of the image by the incident angle described above. Then, the light of the image, which is reflected on the windshield 3, arrives at the eye point EP of the occupant.

In the HUD apparatus 100 of the present embodiment, a light from outside, for example, a sunlight including the infrared light, the visible light, and the ultraviolet light is transmitted through the windshield 3 and enters the cold mirror 60 by retrograding through the optical path OP. Much of the infrared light and the ultraviolet light included in the light from outside deviates from the optical path OP after transmitted through the windshield 3. A part of the light from outside reflected by the cold mirror 60 is shielded by the polarizing film 50. With this configuration, a ratio of the retrograde light amount to the light amount entered from outside can be decreased. The retrograde light is the light entered from outside and retrogrades through the optical path OP to arrive at the liquid crystal panel 20.

(Advantages)

The following will describe advantages obtained by the above-described configuration of the first embodiment.

In the first embodiment, the liquid crystal panel 20 functioning as the imaging element outputs the generated image as the light having a predetermined polarization state using the light outputted from the light source portion 10. The light of the image outputted from the liquid crystal panel 20 is converted into the S wave by the phase difference film 30 that functions as the phase shifter. The light of the image enters the cold mirror 60, in which the optical multilayer film 64 is configured to be disposed on the translucent base member 62. With this configuration, the incidence of the P wave component of the light into the cold mirror 60 can be restricted. Thus, a difference of the polarization state responding to a wavelength can be restricted. Herein, the difference of the polarization state is caused by the wavelength dependence of the phase difference between the two wave components. When the light of the image reflected by the cold mirror 60 is transmitted toward the windshield 3, which functions as the projecting portion, a difference of the reflectance is restricted. Thus, the spectral distribution of the light of the image recognized by the occupant is less likely to change compared with the spectral distribution of the light of the image outputted from the liquid crystal panel 20. Thus, a color of the image recognized by the viewer is close to the original color generated by the liquid crystal panel 20. With this configuration, the HUD apparatus 100 can achieve high color reproducibility.

In the first embodiment, on the optical path OP between the phase difference film 30 and the cold mirror 60, the configuration includes the polarizing film 50 functioning as a polarizing element. The shield axis 54 of the polarizing film 50 is disposed along the plane of incidence. In this configuration, when the light of the image is not completely converted into the S wave after passing through the phase difference film 30 because of a manufacturing error or the like, the light shield axis 54 disposed along the plane of incidence shields the P wave component. Thus, the highly precise S wave component can enter the cold mirror 60.

In the first embodiment, the phase difference film 30 and the polarizing film 50, each of which has the film shape, are supported by the same translucent substrate 40. With this configuration, the arrangement of the phase difference film 30 and the polarizing film 50 can be easily implemented and the strength can be secured. So, the HUD apparatus 100 can achieve high color reproducibility using a simplified structure.

In the first embodiment, for the light having wavelength range of 400 nm to 700 nm, the optical multilayer film 64 of the cold mirror 60 has the reflectance of equal to or greater than 95 percent. With this configuration, the cold mirror 60 has the high reflectance regarding the wide wavelength range of the visible light, and can effectively reflect the light of the image generated by the liquid crystal panel 20. Thus, the configuration can avoid a situation that an amount of the visible light having specific wavelength decreases when the light arrives at the viewer. Thus, the viewer can recognize the image having highly reproduced color, which is highly close to the original color generated by the liquid crystal panel 20.

Second Embodiment

Figure 3:
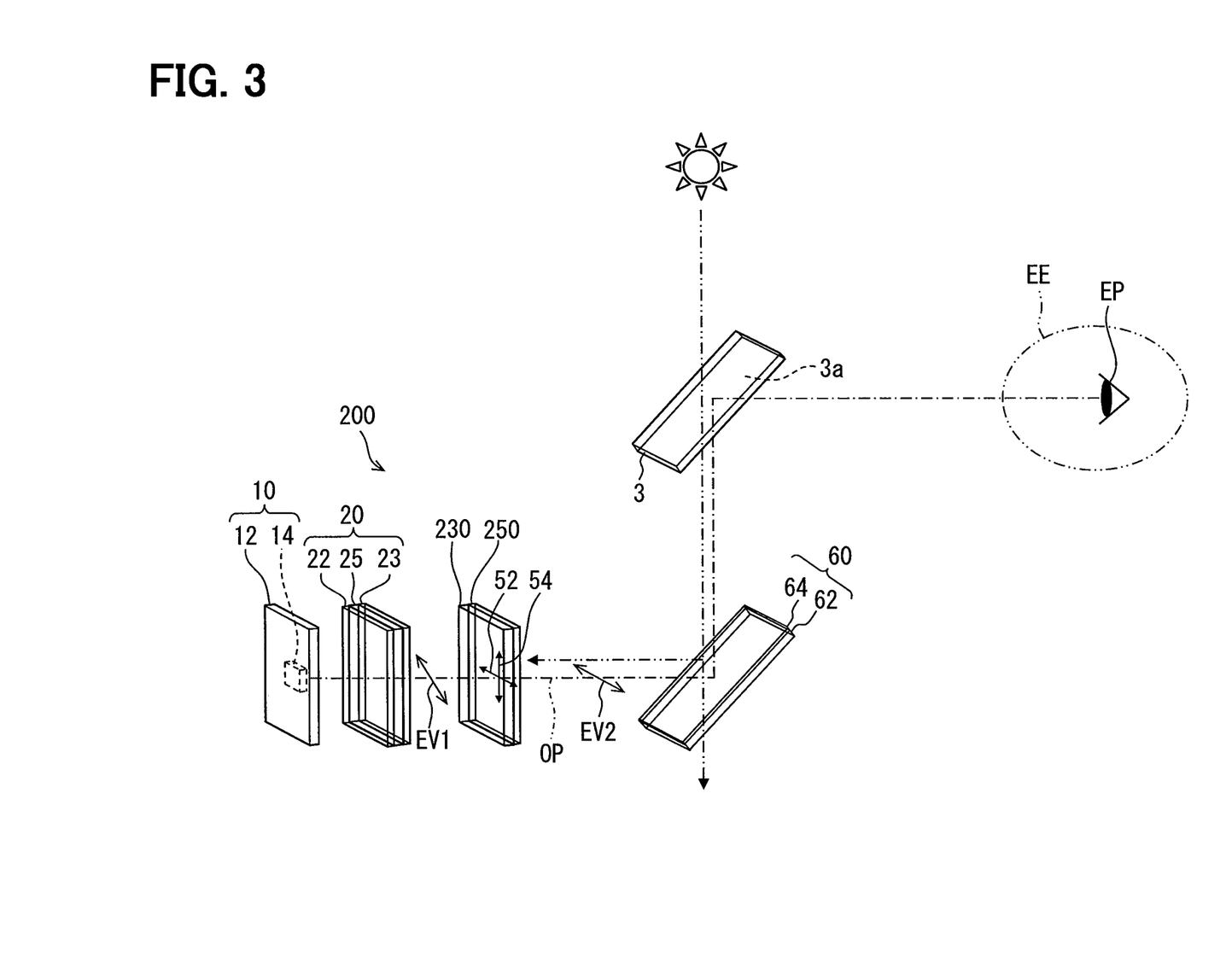
FIG. 3 is a diagram schematically showing a configuration of the HUD apparatus according to a second embodiment of the present disclosure.

As shown in FIG. 3, the second embodiment of the present enclosure is a modification of the first embodiment. The following will describe the difference between the first embodiment and the second embodiment.

An HUD apparatus 200 in the second embodiment does not include a translucent substrate 40, but includes a phase difference plate 230 functioning as a phase shifter supported in a housing 70. The phase difference plate 230 is disposed on an optical path between a liquid crystal panel 20 and a cold mirror 60. The phase difference plate 230 has a plate shape, and is made of uniaxial crystal, such as sapphire, and crystal. In the phase difference plate 230, multiple thin plates are stacked by optical contact joint, or the like, and a thickness of the phase difference plate 230 is properly set to secure strength of the phase difference plate.

A light of an image enters the phase difference plate 230 along a direction in which the multiple thin plates are stacked. Similar to the phase difference film 30 in the first embodiment, the phase difference plate 230 converts the light of the image, which is going to enter a cold mirror 60, into an S wave. The linear polarization in which a direction of the electric field vector EV1 is angled at 45 degrees diagonally from the horizontal direction of the image is converted into the linear polarization in which a direction of an electric field vector EV2 is along the horizontal direction.

On one surface of the phase difference plate 230 facing the cold mirror 60, a polarizing film 250, which has the film shape, is attached to similar to the first embodiment. The polarizing film 250 is supported by the phase difference plate 230. A light shield axis 54 of the polarizing film 250 is disposed along the plane of incidence defined by the cold mirror 60 similar to the first embodiment.

In the above-described second embodiment, the phase difference plate 230 converts the light of the image, which is going to enter a cold mirror 60, into an S wave. The configuration described in the second embodiment can provide advantages similar to the first embodiment.

In the second embodiment, the phase difference plate 230 functioning as the phase shifter has the film shape, and made of uniaxial crystal. The polarizing film 250, which has the film shape, is supported by the phase difference plate 230. With this configuration, the arrangement of the phase difference plate 230 and the polarizing film 250 can be easily implemented using a more simplified structure and the strength of the phase difference plate 230 and the polarizing film 250 can be secured. So, the HUD apparatus 100 can easily achieve high color reproducibility.

Other Embodiment

Embodiments of the present disclosure have been described above. The present disclosure should not be limited to the above embodiments and may be implemented in various other embodiments and combinations without departing from the scope of the present disclosure.

As a first modification of each of the first and second embodiments, an optical device, such as a lens, or a mirror may be additionally disposed on the optical path OP. In an exemplary modification, the mirror is disposed on the optical path OP between a polarizing film 50, 250 and the cold mirror 60. In this case, in order to arrange the light shield axis 54 along the plane of incidence, a direction of the plane of incidence needs to correspond to a direction of the light shield axis 54 of the polarizing film 50, 250, which is projected on a reflecting surface along the optical path OP, because of the reflection of the mirror.

Figure 4:
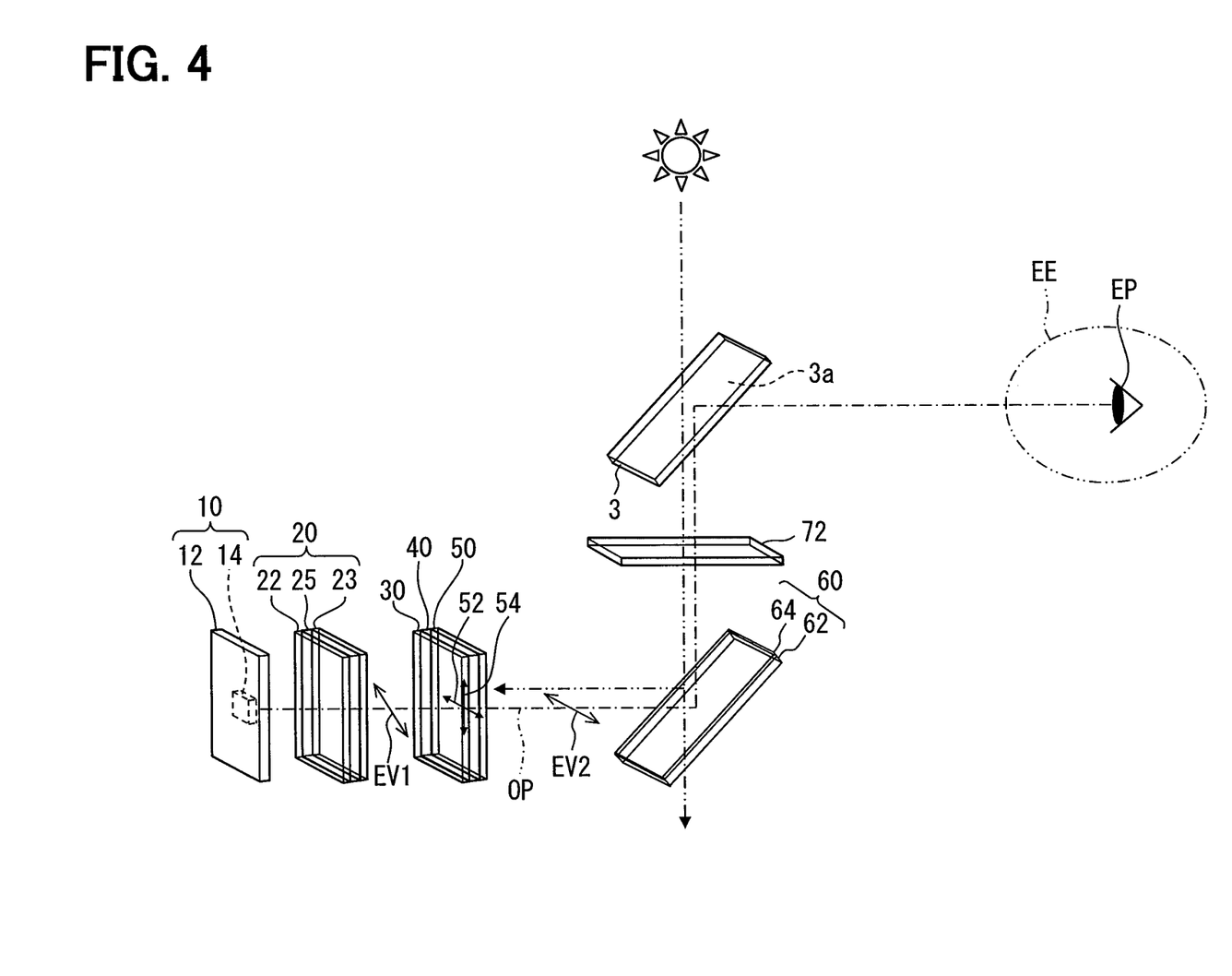
FIG. 4 is a diagram schematically showing a configuration of the HUD apparatus according to an example of a first modification of the present disclosure.

As a specific example of the first modification, as shown in FIG. 4, a translucent dust cover 72, which is made of synthetic resin or glass, may be disposed between the cold mirror 60 and the windshield 3. As a material of the dust cover 72, material generating phase difference like material of the phase shifter, such as rough-rolled polycarbonate resin may be employed. With this configuration, polarization of the light of the image can be optimized (for example, conversion into an S wave with respect to the windshield 3). Herein, the light of the image is reflected by the cold mirror 60, and enters the windshield 3.

As a second modification of each of the first and second embodiments, a polarizing film 50 or 250 may be omitted from the optical path OP between: a phase difference film 30 or a phase difference plate 230; and a cold mirror 60.

As a third modification of each of the first and second embodiments, under a condition that a phase difference film 30 or a phase difference plate 230 converts a light of an image that enters a cold mirror 60 into an S wave, the predetermined polarization state of the phase difference film 30 or the phase difference plate 230 may be the circular polarization, and the circular polarization is converted into the linear polarization. With this configuration, the imaging element may employ an element other than a liquid crystal panel 20. The phase difference film 30 or the phase difference plate 230 may generate phase difference of a specific degree other than 180 degrees.

As a fourth modification of each of the first and second embodiments, a cold mirror 60 may have a reflectance of less than 95 percent regarding a light of an image of a wavelength of 400 nm to 700 nm via an optical multilayer film 64. For example, the cold mirror 60 may have the reflectance of about 80 percent to 90 percent regarding the light of the image of the wavelength of 400 nm to 700 nm. For example, the cold mirror 60 may have the reflectance of equal to or greater than 95 percent regarding only the light of the image of the wavelength outputted from the imaging element.

As a fifth modification of each of the first and second embodiments, in a cold mirror 60, an optical multilayer film 64 may be disposed on a translucent base member 62 that has a curved plate shape.

As a sixth modification of each of the first and second embodiments, as a projecting portion, a combiner separated from a vehicle 1 may be disposed in the vehicle instead of a windshield 3. In this configuration, the image is projected on the combiner.

As a seventh modification of each of the first and second embodiments, the disclosure may be applied to various kind of moving bodies (transportation equipment) other than a vehicle 1. For example, present disclosure may be applied to a ship or an airplane.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A head-up display apparatus mounted on a moving body, wherein the head-up display apparatus projects an image on a projecting portion as a virtual image, and the virtual image is recognized by an occupant when a light of the image is reflected on the projecting portion, the head-up display apparatus comprising:

a light source portion emitting a source light;

an imaging element generating the image when the source light enters the imaging element and outputting the light of the image, the light of the image having a predetermined polarization state;

a cold mirror reflecting the light of the image toward the projecting portion, wherein an optical multilayer film is disposed on a translucent base member in the cold mirror, and the light of the image obliquely enters the cold mirror along a plane of incidence;

a phase shifter converting the light of the image into a linear polarization of an S wave, wherein: the phase shifter is disposed on an optical path between the imaging element and the cold mirror; the light of the image outputted from the phase shifter enters the cold mirror; and, in the S wave, a magnetic field vector is arranged along the plane of incidence; and a polarizing element having a light shield axis disposed along the plane of incidence and configured to shield a P wave component of the light of the image, wherein the polarizing element is disposed on the optical path between the phase shifter and the cold mirror.

2. The head-up display apparatus according to claim 1, wherein each of the phase shifter and the polarizing element has a film shape, and is supported by a same translucent substrate.

3. The head-up display apparatus according to claim 1, wherein the phase shifter is provided by a phase difference plate that has a plate shape and is made of uniaxial crystal, and the polarizing element has a film shape and is supported by the phase shifter.

4. The head-up display apparatus according to claim 1, wherein for the light of the image which has a wavelength range of 400 nm to 700 nm, the cold mirror with the optical multilayer film has a reflectance of equal to or greater than 95 percent.

5. The head-up display apparatus according to claim 1, wherein the optical multilayer film is provided by at least two optical thin films stacked in a normal direction of a surface of the cold mirror and the at least two optical thin films are made of optical materials having different complex index of refractions from one another.

6. The head-up display apparatus according to claim 1, wherein the phase shifter converts the light of the image into only the linear polarization of the S wave.

7. The head-up display apparatus according to claim 1, wherein the polarizing element is further configured to block a part of a retrograde light from outside the moving body and reflected by the cold mirror from reaching the imaging element.

8. The head-up display apparatus according to claim 7, wherein the retrograde light is sunlight.

9. The head-up display apparatus according to claim 1 further comprising:

a translucent dust cover disposed between the projection portion and the cold mirror, the translucent dust cover configured to allow the light of the image in the S wave from the cold mirror to the projection portion to pass while blocking the light of the image in the P wave.

* * * * *